(12) United States Patent
Wagner

(10) Patent No.: US 8,518,200 B2
(45) Date of Patent: Aug. 27, 2013

(54) METHOD AND APPARATUS FOR MANUFACTURING COATED PROFILE MEMBERS

(75) Inventor: Uwe Wagner, Gütersloh (DE)

(73) Assignee: düspohl Maschinenbau GmbH, Schloss Holte-Stukenbrock (DE)

( * ) Notice: Subject to any disclaimer, the term of this patent is extended or adjusted under 35 U.S.C. 154(b) by 187 days.

(21) Appl. No.: 12/920,136

(22) PCT Filed: Feb. 20, 2009

(86) PCT No.: PCT/EP2009/001249
§ 371 (c)(1),
(2), (4) Date: Aug. 30, 2010

(87) PCT Pub. No.: WO2009/109302
PCT Pub. Date: Sep. 11, 2009

(65) Prior Publication Data
US 2011/0005665 A1      Jan. 13, 2011

(30) Foreign Application Priority Data
Mar. 3, 2008   (DE) .......................... 10 2008 012 198

(51) Int. Cl.
*B29C 65/00* (2006.01)
*B32B 37/00* (2006.01)
*B32B 38/00* (2006.01)
*B32B 38/04* (2006.01)

(52) U.S. Cl.
USPC ........... 156/200; 156/196; 156/199; 156/201; 156/250; 156/253; 156/256; 156/258; 156/259; 156/263; 156/267; 156/413; 156/443; 156/510; 156/511; 156/516; 156/517; 156/522

(58) Field of Classification Search
USPC ................. 156/250, 253, 256, 258, 259, 263, 156/267, 510, 511, 516, 517, 522, 196, 199–201, 156/413, 443
See application file for complete search history.

(56) References Cited

U.S. PATENT DOCUMENTS

| | | | |
|---|---|---|---|
| 3,578,535 A | 5/1971 | Gohlfennen et al. | |
| 2002/0074085 A1* | 6/2002 | Huber | 156/304.5 |
| 2002/0092605 A1 | 7/2002 | Scarimbolo | |
| 2004/0076493 A1 | 4/2004 | Tsuboi | |
| 2004/0256051 A1* | 12/2004 | Turvey et al. | 156/204 |
| 2005/0115175 A1* | 6/2005 | Stovall | 52/204.5 |

FOREIGN PATENT DOCUMENTS

| | | |
|---|---|---|
| DE | 1293654 B | 4/1969 |
| DE | 3323658 A1 | 5/1984 |
| DE | 3415053 A1 | 10/1985 |
| DE | 10156314 A1 | 6/2003 |
| EP | 0143882 A | 6/1985 |

* cited by examiner

*Primary Examiner* — Mark A Osele
*Assistant Examiner* — Christopher C Caillouet
(74) *Attorney, Agent, or Firm* — Richard M. Goldberg

(57) ABSTRACT

A method for manufacturing coated profile members (10), wherein a foil (16, 36) is cut to a predetermined width and wrapped around the profile member so as to form a butt seam extending in a longitudinal direction of the profile member, and the foil (16, 36) is cut by a cutting beam (24) in a condition in which an edge strip of the foil projects beyond the profile member (10), while a face of the profile member is used as reference for the position of the cutting beam.

8 Claims, 3 Drawing Sheets

METHOD AND APPARATUS FOR MANUFACTURING COATED PROFILE MEMBERS

BACKGROUND OF THE INVENTION

The invention relates to a method for manufacturing coated profile members, wherein a foil is cut to a predetermined width and wrapped around the profile member so as to form a butt seam extending in a longitudinal direction of the profile member, as well as an apparatus for carrying out this method.

Methods of this type are employed especially for furniture profiles but also for manufacturing door frames, door leaves, window profiles and the like and have the purpose to coat a profile member, e.g. a chipboard or an MDF board, with a decorative foil, e.g., a plastic foil. In this process, the profile member shall be wrapped in at least one foil web such that neither an overlap nor a gap is produced at the positions where the edges of the foil webs abut against one another. This implies that the foil web is precisely cut to a suitable width.

Up to now, this is done by first bonding the foil onto the surface of the profile member and then milling away an edge strip of suitable width from the foil that adheres to the surface of the profile member adjacent to a butt seam which extends, for example, in a certain distance from an edge of the profile member. This method has the drawback that the dust that is produced in the milling process is likely to cause contaminations and other problems. In particular, dust particles may stick to the adhesive layer on the foil that has not yet been bonded onto the profile member, so that ugly pimples are produced when the foil is bonded. Moreover, the milling tool may be soiled by rapidly curing adhesive.

SUMMARY OF THE INVENTION

It is an object of the invention to provide a method and an apparatus which permit to neatly and precisely coating profile members with a foil.

In order to achieve this object, according to the invention, the foil is cut by means of a cutting beam in a condition in which an edge strip of the foil projects beyond the profile member, while a face of the profile member is used as reference for the position of the cutting beam.

The cutting beam is preferably a laser beam. Optionally, however, a water jet or a plasma beam may also be used, for example.

When a reference face of the profile member is gauged, such a beam can be used for producing a clean cut which extends exactly in longitudinal direction of the profile member. During cutting, the edge strip of the foil does not need to be supported on a substrate but projects freely from an edge of the profile member. Moreover, since the cut is performed with a cutting beam, there will be no contact between a cutting tool and the foil which is generally coated already with an adhesive. Consequently, there is no contamination of the cutting tool with adhesive, and there is no risk that the foil will stick to the cutting tool and will thereby be distorted or disturb the formation of a clean cut. After the foil has been cut to suitable width, the projecting edge strip of the foil web is wrapped around the profile member and finally bonded thereto. Since the profile member has been gauged and the cutting beam is positioned with high precision, the width of the projecting and cut edge strip may be controlled such that a clean butt seam is formed after the foil has been wrapped around the profile member.

It turns out to be particularly advantageous that, in this method, the surface of the profile member is not needed for supporting the foil during the cutting process. This opens the possibility, for example, to coat individual profile members with an endless foil web in a continuous process, wherein certain gaps are left between the successive profile members, which gaps are only bridged by the foil. In contrast to conventional procedures where the profile members succeed one another without gaps therebetween and the foil connecting them is torn off along the butting ends in order to separate the profile members from one another, the method according to the invention permits to cleanly cut through the foil bridges that connect the successive profile members.

Useful details and further developments of the invention are indicated in the dependent claims.

BRIEF DESCRIPTION OF THE DRAWINGS

Embodiment examples will now be explained in conjunction with the drawings, wherein.

DETAILED DESCRIPTION

Figure 1:
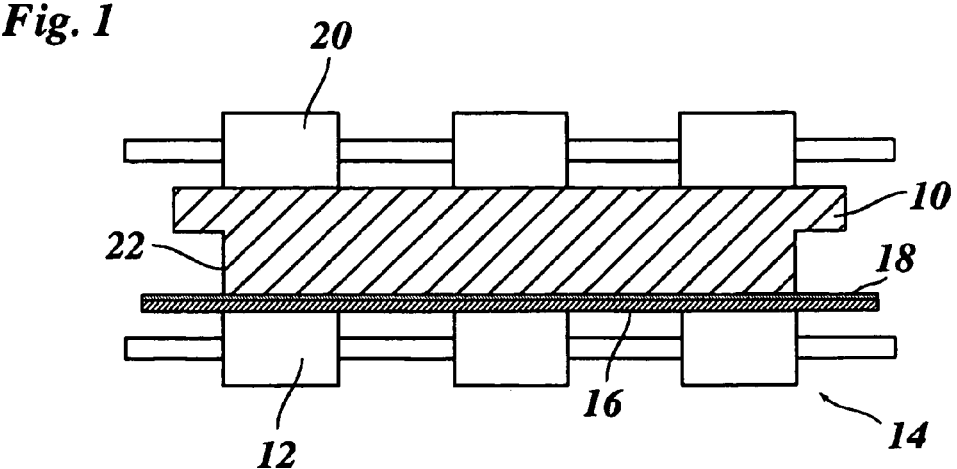
FIGS. 1 to 6 show schematic cross-sectional views of a profile member in different stages of a process of coating it with a foil in accordance with the method according to the invention.

In FIG. 1, a profile member 10, e.g. a door leaf formed by a chipboard or an MDF board, is advanced in the direction normal to the plane of the drawing along a transport path 14 formed by rollers 12. An endless web of a foil 16 has a width that is somewhat larger than the width of the bottom side of the profile member 10 and is provided with an adhesive layer 18 on its top side. The foil 16 is banded to the bottom side of the profile member 10 by means of the rollers 12 while rollers 20 provide a necessary back pressure on the top side of the profile member.

In the example shown, the profile member 10 is formed with a rebate 22 on both sides, and the foil 16 is bonded in such a position that it projects beyond the rebate on both sides.

Figure 2:
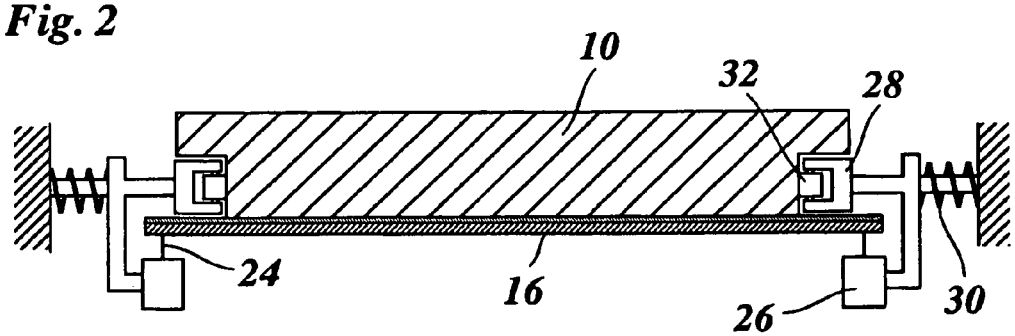

In FIG. 2, the profile member that is coated on one side with the foil 16 passes through a cutting station where the projecting edge strips of the foil 16 are cut to a suitable width by means of cutting beams 24 that are generated by laser cutting heads 26. The cutting heads 26 move along the edges of the foil 16 that freely project beyond the profile member 10 without contact between the cutting heads and the foil, and they perform a cut which extends precisely in longitudinal direction of the profile member 10.

The cutting heads 26 are rigidly connected to callipers 28 each of which gauges a lateral face of the profile member 10, a face of the rebate 22 in the example shown. For example, the calipers 28 are elastically biased against the lateral edges of the profile member by means of springs 30, and, in order to reduce friction, they roll over the lateral face of the profile member with rollers 32.

In this way, the face of the rebate 22 which extends at right angles to the foil 16 serves as a positional reference for the cutting edge 24, so that the projecting width of the foil can be controlled with high precision. In the example shown, this projecting width has been selected such that it corresponds exactly to the face of the rebate 22 that extends at right angles to the plane of the door leaf.

Figure 3:
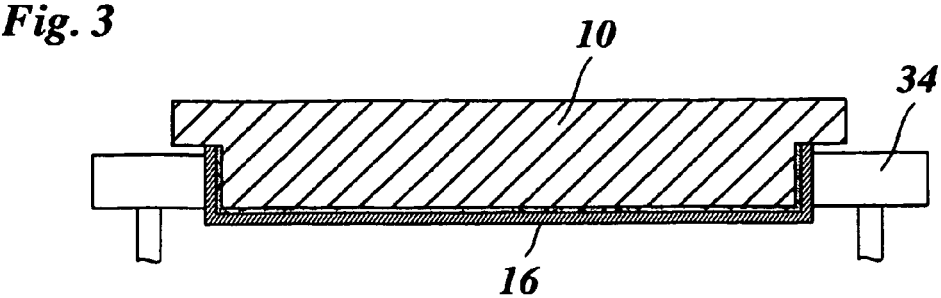

In a subsequent process step, shown in FIG. 3, the projecting edge strips of the foil are bent over by means of rollers 34 and are pressed against the internal faces of the rebates 22. Thanks to the precise positioning of the cutting heads 26, the foil will then reach exactly to the internal corner of the rebate, thereby forming a butt seam with the broader part of the profile member 10.

Figure 4:
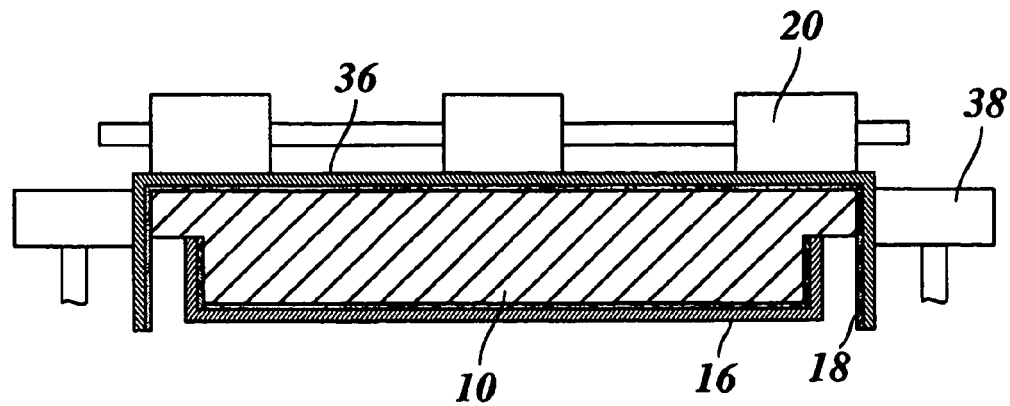

In a next step, as is shown in FIG. 4, another foil 36 is bonded to the top side of the profile member 10, and the edges of the foil that project on both sides are bent by means of rollers 38 and are bonded to the lateral faces of the profile member. The width of the foil 36 has been selected such that it projects significantly beyond the lateral faces of the profile member in the vicinity of the rebates.

Figure 5:
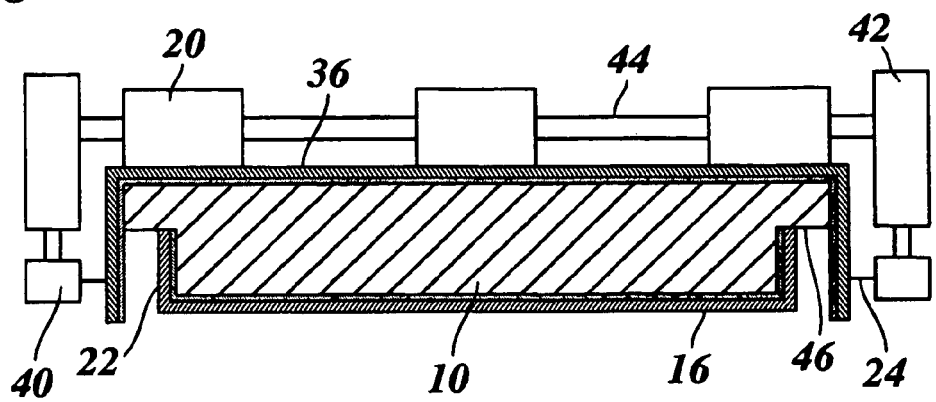

FIG. 5 illustrates another cutting station where the projecting edge strips of the foil 36 are cut to a desired width by means of cutting beams 24 of laser cutting heads 40. The cutting heads 40 are rigidly secured to brackets 42 which are in turn rigidly connected to a common axle 44 of the rollers 20 which serve for bonding the foil 36 to the top surface of the profile member 10. A suitable mechanism, which has not been shown, biases the axle 44 elastically against the transport path 14 (which has only been shown in FIG. 1). Thus, the top surface of the profile member 10 is gauged by the rollers 20 and serves as a positional reference for the cutting beams 24. The height of the cutting heads 40 has been selected such that the widths of the projecting edge strips of the foil 36 are each reduced to a width that corresponds to the width of the faces 46 of the rebates 22 that extend in parallel with the plane of the door leaf.

Figure 6:
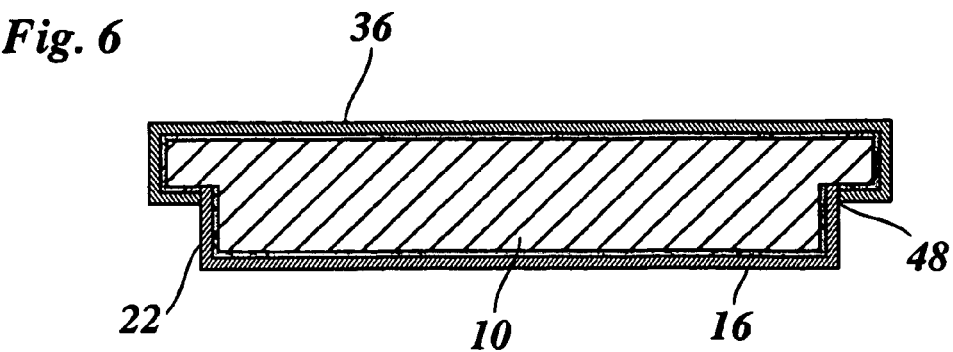

FIG. 6 shows the final condition in which the projecting edge strips of the foil 36 have been bent and bonded into the rebates 22. It can be seen that the edges of the foils 16 and 36 form precise butt seams 48 in the internal corners of the rebates 22.

Since, in each of the cutting processes shown in FIGS. 2 and 5, a surface of the profile member 10 is gauged and serves as a reference for the position of the cutting beam 24, the method is robust against any possible dimensional or positional tolerances of the profile members.

Figure 7:
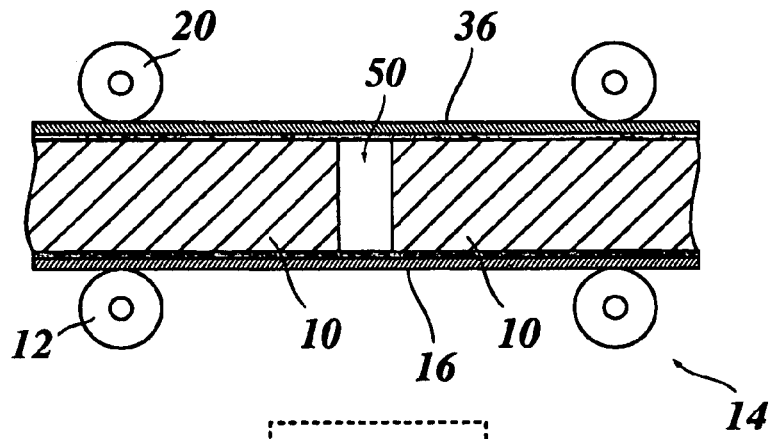
FIG. 7 a schematic longitudinal section of the ends of two profile members which are held together by the foil wrapped around them.

FIG. 7 shows, in a longitudinal section, two profile members 10 which are fed along the transport path 14 and have been coated with the foils 16 and 36 by means of the process illustrated in FIGS. 1 to 6, wherein the foils 16, 36 have been supplied as endless webs. It can be seen that the end faces of the two profile members 10 are separated from one another by a certain gap 50. They are however held together by the continuous foils 16 and 36. The gaps 50 permit to neatly separate the individual coated profile members 10 from one another by cutting through the foil bridges formed between them. Since the edge strips of the foils 16 and 36 project freely from the profile members, anyway, when they are cut with the cutting beams 24 (FIGS. 2 and 5), the gaps 50 between the individual profile members do not hamper the cutting process.

Figure 8:
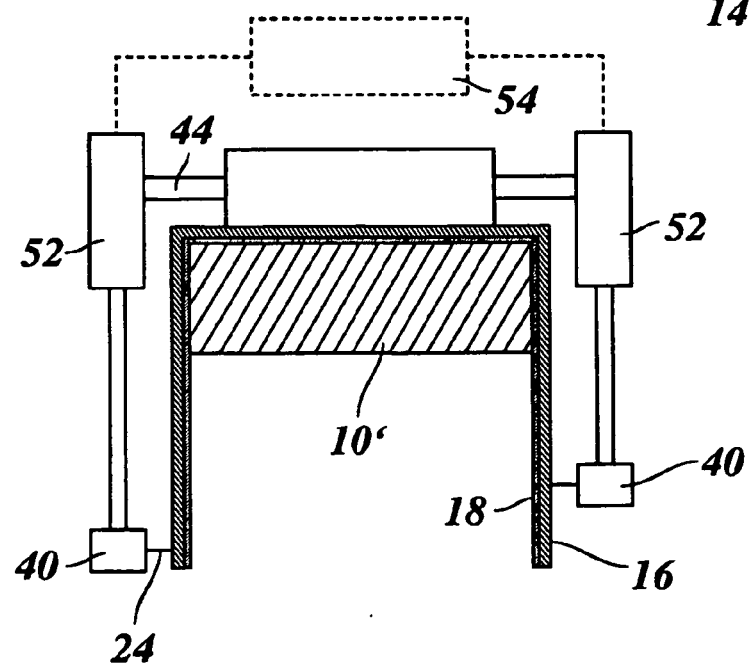
FIG. 8 a schematic sectional view of a profile member for illustrating a modified embodiment of the method according to the invention.

FIG. 8 illustrates a modified embodiment of the method, wherein a profile member 10' which in this case has a simple rectangular cross section is coated with a single foil 16. Here, the cutting beams 24 are used for cutting the projecting edge strips of the foil to such a width that they form a single butt seam at the bottom side of the profile member 10' after they have been folded over.

Figure 9:
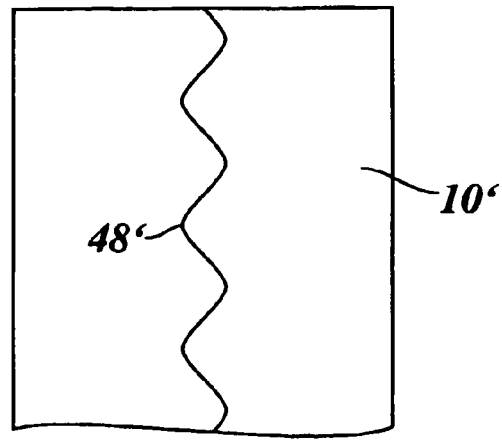
FIG. 9 a butt seam of a profile member that has been coated in accordance with the method shown in FIG. 8.

The cutting station shown in FIG. 8 is different from the cutting station shown in FIG. 5 mainly in that the rigid brackets 42 have been replaced by actuators 52 that are controlled by a control system 54 such that the heights of the two cutting heads 40 relative to the profile member 10' are varied precisely in opposite sense. For example, the cutting heads 40 perform a sinusoidal oscillation in vertical direction. After the cut edge strips of the foil 16 have been bent over, they form a sinusoidal butt seam 48' as shown in FIG. 9. Depending on the decorative pattern on the foil 16, such an oscillating shape of the butt seam 48' may be useful for making this seam less visible.

As an alternative, the two cutting heads 40 may be coupled to one another mechanically and may be driven by a common actuator.

The invention claimed is:

1. Method for manufacturing coated profile members, comprising the steps of:

providing a foil with an adhesive layer, securing the foil to at least one surface of the profile member by said adhesive layer such that a free edge strip of the foil projects beyond at least one surface of the profile member, thereafter gauging a face of the profile member with a calliper so that this face serves as a reference for the position of a cutting beam, cutting, in response to the step of gauging, the free edge strip of the foil that projects beyond at least one surface of the profile member to a predetermined width by a cutting tool comprised of a beam cutting head adapted to generate the cutting beam and arranged to contactlessly cut the free edge strip of the foil that projects beyond the at least one surface of the profile member by the cutting beam to provide a free edge thereof, and thereafter wrapping the cut foil around the profile member by an applicator member so that the free edge of the foil formed in the cutting step forms a butt seam extending in a longitudinal direction of the profile member.

2. Method according to claim 1, wherein the profile members are plate-shaped, and further comprising the steps of:

applying a first said cut foil on one side of the profile member, and applying a second said cut foil on an opposite side of the profile member such that the two foils form two butt seams with one another.

3. Method according to claim 2, further comprising the step of forming the butt seams in rebates of the profile member.

4. Method according to claim 1, wherein:

the step of cutting includes the step of cutting the foil while projecting edges thereof are coplanar with a remainder of the foil, and the step of gauging includes the step of using side faces of the profile member that extend at right angles to the central portion of the foil as the reference.

5. Method according to claim 1, wherein:

the step of cutting includes the step of cutting the foil in a condition where projecting edges thereof are bent relative to a central portion of the foil and engage side faces of the profile member that extend at right angles to said central portion, and the step of gauging includes the step of using a surface of the profile member that extends in parallel with the central portion of the foil as the reference.

6. Method according to claim 1, further comprising the steps of:

successively advancing a plurality of profile members on a transport path, with gaps formed between the profile members, and coating the successively advanced profile members with the foil that is supplied in the form of an endless web, so that individual profile members are held together by foil bridges.

7. Method according to claim 1, wherein the step of cutting includes the step of synchronously varying the positions of cutting beams that are used for cutting edges of the foil that belong to one and the same butt seam, relative to the reference surface of the profile so as to form a meandering butt seam.

8. Apparatus for manufacturing coated profile members, comprising:
   an arrangement for adhering a foil with an adhesive layer thereon and a first width to a profile member of a second width less than the first width such that a free portion of the foil extends outwardly from said profile member,
   a calliper arranged to gauge a face of the profile member when the foil is adhered thereto, so that this face serves as a reference for the position of a cutting beam, the calliper arranged downstream of the arrangement for adhering,
   a cutting tool for cutting the free portion of the foil, in response to the gauging by the calliper, so that the foil extends to a predetermined width after the foil has been adhered to the profile member and is formed with a free edge, the cutting tool arranged downstream of the arrangement for adhering, and
   an applicator member for wrapping the cut, free portion of the foil around the profile member so that the free edge of the foil formed by the cutting tool forms a butt seam extending in a longitudinal direction of the profile member, the applicator member arranged downstream of the cutting tool,
   wherein the cutting tool is a beam cutting head adapted to generate a cutting beam and arranged to contactlessly cut the foil by the cutting beam in a condition in which an edge strip of the foil projects beyond the profile member.

* * * * *